United States Patent [19]

Hassitt et al.

[11] Patent Number: 4,603,323
[45] Date of Patent: Jul. 29, 1986

[54] METHOD FOR EXTENDING THE EXPONENT RANGE OF AN IBM 370-TYPE FLOATING POINT PROCESSOR

[75] Inventors: Anthony Hassitt, Mountain View; Alan H. Karp, Palo Alto; Randolph G. Scarborough, Mountain View, all of Calif.

[73] Assignee: International Business Machines Corporation, Armonk, N.Y.

[21] Appl. No.: 614,410

[22] Filed: May 25, 1984

[51] Int. Cl.⁴ .............................................. H03M 1/12
[52] U.S. Cl. .............................. 340/347 DD; 364/748; 235/310
[58] Field of Search .................. 364/748; 235/310; 340/347 DD

[56] References Cited

U.S. PATENT DOCUMENTS 3,400,371 9/1968 Amdahl et al.
3,742,198 6/1973 Morris.

OTHER PUBLICATIONS

IBM System/370 Principles of Operation, IBM Publication GA 22-7000-G, 7th Edition, Chapter 9, Mar. 1980.

*Primary Examiner*—William M. Shoop, Jr.
*Assistant Examiner*—Saul M. Bergmann
*Attorney, Agent, or Firm*—R. Bruce Brodie

[57] ABSTRACT

A method for extending the exponent range in an IBM System/370-type floating point arithmetic processor. Very large or very small numbers are represented by a pair of words having sign, exponent, and fraction portions thereof. If the signs of the low- and high-order words of a pair are the same, then the number is deemed to be in the ordinary processor operating range. However, if the signs differ, then the number is deemed to be out of range. In this case, a range extension is obtained by using the exponent field of the low-order word which otherwise would be transparent to the floating point processor.

3 Claims, 3 Drawing Figures

High Order Part

| S | Characteristic | Leftmost 14-Digits of Fraction |
|---|---|---|
| 0 | 7 | 63 |

Low Order Part

| F | Characteristic | Rightmost 14-Digits of Fraction |
|---|---|---|
| 64 | 71 | 127 |

The extended precision floating-point number format.

C = A + B

C = A * B

METHOD FOR EXTENDING THE EXPONENT RANGE OF AN IBM 370-TYPE FLOATING POINT PROCESSOR

TECHNICAL FIELD

This invention relates to digital computers employing floating point arithmetic operations and, more particularly, to the use in such computers of a new representation of floating point numbers.

BACKGROUND

As pointed out in the IBM System/370 Principles of Operation, 7th Edition, March 1980, IBM publication GA22-7000-6, in chapter 9, there is a characterization of a floating point number as consisting of a signed hexadecimal "fraction" and an unsigned 7-bit binary integer called the "characteristic". The "characteristic" represents a signed exponent and is obtained by adding 64 to the exponent value. This is termed "excess-64 notation". The range of the characteristic is 0–127, which corresponds to an exponent range of −64 to +63. The value of a floating point number is the product of its fraction and the number 16 raised to the power of the exponent which is represented by its characteristic.

The fraction of a floating point number is treated as a hexadecimal number because it is considered to be multiplied by a number which is a power of 16. The term "fraction" indicates that the radix point is assumed to be immediately to the left of the leftmost fraction digit. The fraction is represented by its absolute value and a separate sign bit. The entire number is positive or negative, depending on whether the sign bit of the fraction is 0 or 1, respectively.

When a floating point operation would cause the result exponent to exceed 63, the characteristic wraps around from 127 to 0 and an exponent-overflow condition exists. The resultant characteristic is then too small by 128. When an operation would cause the exponent to be less than −64, the characteristic wraps around from 0 to 127 and an exponent-underflow condition exists. The resultant characteristic is then too large by 128, except that a 0 characteristic is produced when a true 0 is forced.

In computers of the IBM System/370 type having a floating point arithmetic capability, floating point numbers have a 32-bit (short) format, a 64-bit (long) format, or a 128-bit (extended) format. The extended floating point number has a 28-digit fraction and consists of two long floating point numbers which are called the high-order and low-order parts. The high-order part may be any long floating point number. The fraction of the high-order part contains the leftmost 14 hexadecimal significant digits of the 28-digit fraction. The characteristic and sign of the high-order part are the characteristic and sign of the extended floating point number. If the high-order part is normalized, the extended number is considered normalized. The fraction of the low-order part contains the rightmost 14 digits of the 28-digit fraction. The sign and characteristic of the low-order part of an extended operand are ignored. Relatedly, the process of normalization consists of shifting the fraction left, one digit at a time, until the high-order hexadecimal digit is non-zero and concurrently reducing the characteristic by the number of hexadecimal digits shifted.

In the extended precision format, a floating point number of magnitude m lies in the range $$16^{(-65)} \leq m \leq (1-16^{(-28)}) \times 16^{63}.$$

In decimal terms this is approximately $$5.4 \times 10^{(-79)} \leq m \leq 7.2 \times 10^{75}.$$

Others have attempted to use multiple fields in a computer word to extend the range of floating point magnitude representations within a digital computer. Illustrative, is Morris, U.S. Pat. No. 3,742,198, issued June 26, 1973, "Apparatus for Utilizing a Three-field Word to Represent a Floating Point Number". Morris subdivides a fixed length digital computer word into three fields. A first and second field is subdivided into a variable length exponent field and a variable length fraction field. The third field serves to specify the size of the variable length exponent field. This permits a tradeoff between accuracy and range in the floating point representation of the number.

It is accordingly an object of this invention to devise a method for extending the exponent range of numbers utilized by an IBM System/370-type floating point arithmetic processor while maintaining compatibility with existing floating point number representations.

THE INVENTION

The foregoing object is attained by a method for operatively extending the exponent range in a floating point arithmetic processor of the type in which each numerical signal value is expressed as a pair of formatted words. The first word corresponds to a high-order sign, exponent, and fraction while the second word corresponds to a low-order sign, exponent, and fraction. The processor responsive to the formatted word pair does not ordinarily operate upon selective low-order fields. The method steps include (a) ascertaining the floating point range of the operand of each numerical signal value and of any resultant obtained by the arithmetic operation upon said operand or multiple operands; and (b) reformatting any operands or resultants which lie in the extended range in a sign bit-manipulated and protected field of a corresponding low-order word. Relatedly, the sign bit-manipulated and extended field of the low-order word also includes the sign and exponent fields.

The method of this invention relates to a new use of an atomic instruction. That is, namely, one of reformatting the low-order word of a word pair to contain an operand/resultant when said operand/resultant lies in the extended range. This is absent from the prior art. Indeed, the aforementioned Morris patent teaches only the conversion of a fixed field computer word to a three-field floating point word and vice versa.

DESCRIPTION OF THE PREFERRED EMBODIMENT AND INDUSTRIAL APPLICABILITY

The Execution Environment

As a preliminary, the method of this invention is executable upon a computing system of the type including a main store, input/output channel, control unit, direct access storage devices, local addressable clocks, and other I/O devices coupled thereto. Such a system is described in Amdahl et al, U.S. Pat. No. 3,400,371, issued Sept. 3, 1968, and entitled "Data Processing System". The Amdahl system includes as a resource, all of the facilities of either the computing system or of an operating system running thereon which are required for execution of a process including the method of this invention. Typical resources include a main store, I/O devices, the CPU, data sets, and control or processing programs. Furthermore, such systems are capable of multiprogramming. This pertains to the concurrent execution of two or more processes by a computing system, and can be managed on a computer running under an IBM System/370 operating system described in IBM publication GC28-6646, July 1973, and listed in IBM System/360 bibliography, GA22-6822.

Extended Floating Point Number Representation

Figure 1:
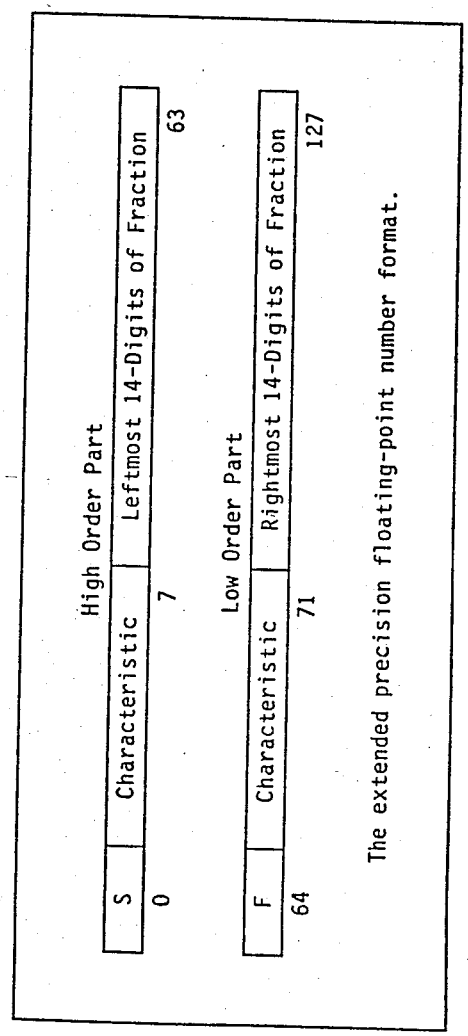
FIG. 1 depicts the extended precision of floating point number format used in the invention.

Referring now to FIG. 1, there is shown a floating point number in the extended exponent, extended precision format. This format consists of a hexadecimal fraction of 112 bits, an unsigned binary integer of 14 bits termed the characteristic, a sign bit, and a flag bit for a total of 128 bits. The characteristic represents a signed exponent and is obtained by adding a bias to the exponent value. For purposes of this description, a bias may be taken to mean an offset or an adjustment.

The interpretation of the characteristic and the bias depends on the value of a flag bit. In this sense, a flag bit is a single bit used to differentiate between two states of interest. If the flag bit is the same as the sign bit, then the number has an exponent between $-64$ and $+63$. Further, the number fits into the normal extended precision number range. In the case that the signed bit is the same as the flag bit, the high-order 7 bits of a characteristic represent the exponent biased by 64 and the low-order 7 bits are ignored. If the flag bit is different from the sign bit, then the number is in the new number format and the characteristic is treated as a 14-bit exponent biased by 8192. Note that the magnitude 8192 is $2^{13}$.

When the result of an extended precision floating point operation has an exponent between $-64$ and $+63$, then irrespective of the formats of the operands of the operation, the flag bit and the sign bit are made identical and the characteristic is made a 7-bit exponent biased by 64. When the result of an extended precision floating point operation has an exponent which is greater than $+63$, then the flag bit is made different from the sign bit and the characteristic is made a 14-bit exponent biased by 8192. If the result exponent exceeds 8190, then an exponent-overflow condition exists, and the exponent, if it exceeds 8191, wraps around to $-8192$. When the result of an extended precision floating point operation has an exponent which is less than $-64$, then the flag bit is made different from the sign bit and the characteristic is made a 14-bit exponent biased by 8192. If the result exponent is less than $-8191$, then an exponent-underflow condition exists, and the exponent, if it is less than $-8192$, wraps around to 8191.

The fraction of a floating point number is treated the same in this invention whether the exponent is a 7-bit exponent or a 14-bit exponent. It is a number between 1/16 and 1 that is to be multiplied by a power of 16. The radix point is assumed to be immediately to the left of the leftmost fraction digit. The fraction in turn is represented by its absolute value and a separate sign bit. The entire number is positive or negative, depending on whether the sign bit of the fraction is 0 or 1, respectively.

Referring again to FIG. 1, it is apparent that the first bit (bit 0) is a sign bit. In both the 7-bit and 14-bit exponent formats, the number is negative, if and only if, this bit is set to 1. Bits 1-7 and 65-71 are respectively the high-order and low-order parts of the characteristic. Bit 64 is used as a flag in order to distinguish 7-bit exponents from 14-bit exponents.

If bit 64 is the same as bit 0, then the number has a 7-bit exponent biased by 64. In this format, the low-order 7 bits of the characteristic are ignored. However, if bit 64 is different from bit 0, then the number has a 14-bit exponent biased by 8192. In this format, bits 1-7 concatenated with bits 65-71 represent a 14-bit characteristic.

The range covered by the magnitude m of a normalized extended precision number depends on the format. In the 7-bit exponent format, reference can be made to the prior description. In the 14-bit exponent format, m lies in the range $$16^{(-8192)} \leq m \leq (1-16^{(-28)}) \times 16^{8190}$$

or $$7.06 \times 10^{(-9865)} < m < 5.52 \times 10^{9861}.$$

Figure 2:
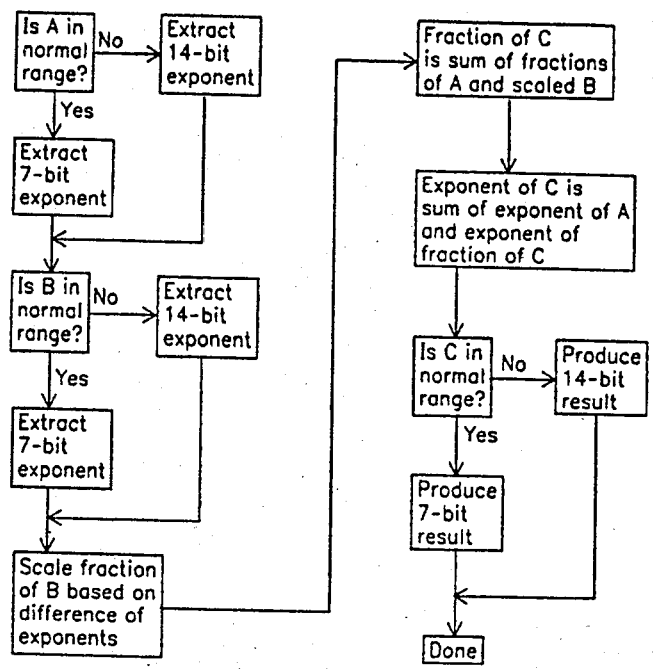
FIG. 2 sets out a high-level logical flow in floating point addition of two numbers invoking the inventive method.
Figure 3:
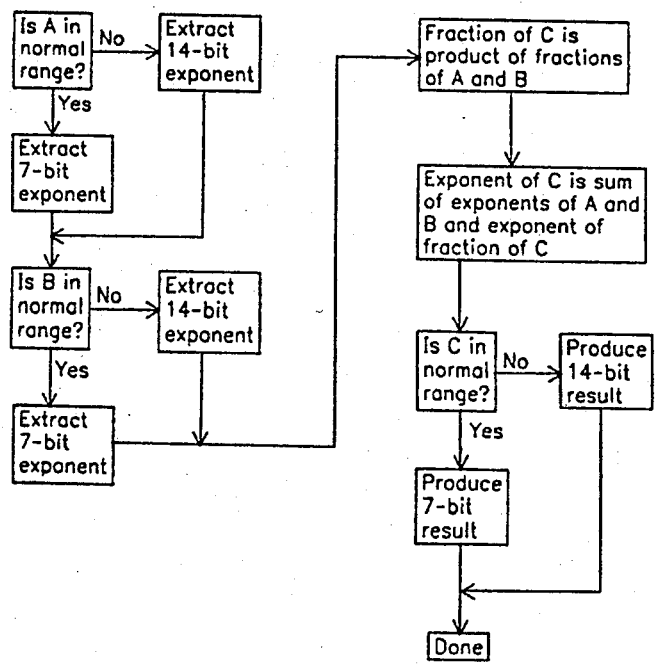
FIG. 3 sets out the multiplication of two floating point numbers according to the invention in high-level flow.

In the ensuing description of the invention, several tables depicting software fragments embodying the preferred representation of the invention will be used in several examples. In this regard, Table 1, in conjunction with FIG. 2, illustrates the addition of two floating point numbers involving the extended range method. Likewise, Table 2, in conjunction with FIG. 3, shows the multiplication of two floating point numbers. Further, Table 3 sets forth software sequences invoking either the addition or multiplication operations. Lastly, Table 4 sets out the computational results of these operations.

Referring now to Table 1 and FIG. 2, there is illustrated the addition of two floating point numbers according to the invention. The first step in adding two numbers is to extract the exponents of the two operands. This is done by determining if each number is in the normal range. If it is in the normal range, a 7-bit exponent is extracted. If it is not in the normal range, a 14-bit exponent is extracted. The next step in the procedure is to scale the fraction of one of the operands based on the difference of the exponents of the two operands. The next step is to form the fraction of the result by adding the fractions of the two operands as scaled. Next, the exponent of the result is formed by adding the exponent of the unscaled operand to the exponent of the fraction of the result. If the result is in the normal range, an exponent in the 7-bit format is produced. If the result is not in the normal range, an exponent in the 14-bit format is produced. An embodiment to this algorithm is shown in Table 1 and is set out in the IBM System/370 Assembly language.

TABLE 1

EXTENDED FLOATING POINT ADD ROUTINE

Copyright IBM Corporation 1984

```
* Special extended precision addition of FPRs 0 and 4
*
IHOXAR04 CSECT
RHOA     EQU   0
RLOA     EQU   2
RHOB     EQU   4
RLOB     EQU   6
         USING *,15         Set base register
START    B     BEGIN        Branch around identifier
         DC    AL1(8)
         DC    CL8'IHOXAR04'
*
* Before touching GPR's, save them
*
BEGIN    STM   14,12,12(13) Save caller's registers
         LR    2,13
         ST    2,SAVE+4
         LA    13,SAVE
         ST    13,8(2)
         LTDR  RHOB,RHOB    Check high order part of B
         BZ    RETURN       B is zero so done
*
BNOTO    LTDR  RHOA,RHOA    Check high order part of A
         BNZ   ANOTO
         LDR   RHOA,RHOB    A is zero so set A to B
         LDR   RLOA,RLOB
         B     RETURN       Finished
*
* Neither A nor B is zero -- save A and B and continue
*
ANOTO    STD   RHOA,HOA     Save high order part of A
         STD   RLOA,LOA     Save low order part of A
         STD   RHOB,HOB     Save high order part of B
         STD   RLOB,LOB     Save low order part of B
*
* Check for result in range so standard add can be done
*
         L     2,HOA        Load high order A
         X     2,LOA        Exclusive or to check signs match
         L     3,HOB        Load high order B
         X     3,LOB        Exclusive or to check signs match
         LTR   2,2          Result > = 0 they match -- A in range
         BM    NOSTD        No match--out of range
         LTR   3,3          Result > = 0 they match -- B in range
         BM    NOSTD        No match--out of range
* In range -- check for possible overflow
         TM    HOA,X'7F'    Check for overflow of A (0/127)
         BO    NOSTD        Yes--standard add not possible
         TM    HOB,X'7F'    Check for overflow of B (0/127)
         BO    NOSTD        Yes--standard add not possible
```

```
54    * Set up to mask underflow and do the standard add
55            BALR     0,0            Save the PSW mask
56            LA       1,X'D00'       Set up for masking underflow
57            SPM      1              Zap the mask
58            AXR      RHOA,RHOB      Do the standard add
59            BZ       TUNDER         Zero -- check for underflow
60            SPM      0              Restore the PSW mask
61            B        RETURN         Return
62    *
63    * Result was true zero -- either underflow or 0 and 4 equal
64    * If -A = B, then result was a true zero
65    * Beware of problems with CDR if low order mantissa is 0
66    *
67    TUNDER   SPM      0              Restore the PSW mask
68            XC       HOA(16),X80    Swap signs on A
69            CLC      HOA(16),HOB    Compare -A to B
70            BE       RETURN         They match, return
71            XC       HOA(16),X80    No match, restore A's signs
72            LD       RLOA,LOA       Restore low order A after AXR
73    *
74    * Standard add not possible
75    *
76    NOSTD    STD      RHOB,HOX       Save high order B
77    *
78    * Set up A for non-standard add
79    *
80            IC       0,HOA          Load exponent of A
81            N        0,I127         Strip sign off of A
82            S        0,NBIAS        Subtract hex 40 from exponent
83            LTR      2,2            Result > = 0 normal range
84            BNM      AINR           Yes--In range bypass 14 digit build
85            L        1,LOA          Load low order part of A
86            SLL      1,1            Strip off first bit
87            SLDL     0,7            Now have 14-bit exponent in GPR 0
88    AINR     ST       0,HOXA         Save exponent of A for later use
89    *
90    * Set up B for non-standard add
91    *
92            IC       0,HOB          Load exponent of B
93            N        0,I127         Strip off sign of B
94            S        0,NBIAS        Subtract hex 40 from exponent
95            LTR      3,3            Result > 0 if normal number
96            BNM      BINR
97            L        1,LOB          Load low order part of B
98            SLL      1,1            Strip off first bit
99            SLDL     0,7            Now have 14-bit exponent in GPR 0
100   *
101   BINR     ST       0,HOXB         Save exponent of B for later use
102            S        0,HOXA         X = HOX(B) - HOX(A) in GPR 0
103            C        0,I28          Is difference > 28 digits?
104            BNH      BNBIG
105   *
106            LDR      RHOA,RHOB      B is much bigger
107            LDR      RLOA,RLOB          so result = B
108            B        RETURN
109   *
110   BNBIG    C        0,M28          Is difference < -28 digits?
```

```
111         BL      RETURN          Yes, so A is result
112  *
113         IC      1,HOA           Pick up high order A
114         N       1,I128          Get sign of high order A only
115         LA      1,64(1)         Put in exponent of 64
116         STC     1,HOA           Store exponent into A
117         IC      1,HOB           Pick up high order B
118         N       1,I128          Get sign of high order B only
119         LA      1,64(1)         Set exponent to 64
120         AR      1,0             Add X to 64 exponent
121         STC     1,HOB           Store exponent into B
122  *
123  * At this point A is of order 1 and B has proper exponent
124  *
125         LD      RHOA,HOA        Restore high order part of A
126         LD      RHOB,HOB        Restore high order part of B
127         AXR     RHOA,RHOB       Add A and B
128         BZ      DONE            Done if result is zero
129  *
130  * Extract exponent of result and add to X
131  *
132         STD     RHOA,HOC        Store high order part of C
133         STD     RLOA,LOC        Store low order part of C
134         IC      2,HOC           Load exponent of C
135         N       2,I128          Leave nothing but sign
136  *
137         IC      0,HOC           Put exponent into GPR 0
138         N       0,I127          Remove sign from exponent of C
139         A       0,HOXA          Add in delta to exponent
140  *
141  * See if result is in range
142  *
143         LTR     0,0             Compare X to 0
144         BL      COR
145         C       0,I127          Compare X to 127
146         BH      COR
147  *
148  * Result is in range - add in bias and put in sign
149  *
150         LR      1,0             Save exponent with bias
151         OR      0,2             Put in sign
152         STC     0,HOC           Store exponent
153         LD      RHOA,HOC        Put result into register for return
154         LA      1,X'FF2'(1)     Subtract 14 from exponent
155         N       1,I127          Turn off sign bit
156         OR      1,2             Put in sign of result
157         STC     1,LOC           Put in correct LOX(C)
158         LD      RLOA,LOC        Transfer result to FPR
159         B       DONE
160  *
161  * Fix up exponent with proper sign whether ok, under or overflow
162  *
163  COR    A       0,I8192M64      Add in expanded bias
164         LR      5,0             Save exponent
165         SRDL    0,7             Separate exponent into 2 parts
166         SRL     1,25            Right justify LOX
167         N       0,I127          Turn high bit off in case of overflow
```

```
168            OR       0,2             Put sign bit in place
169            X        2,I128          Switch sign
170            OR       1,2             Put sign on LOC
171            STC      0,HOC           Store exponent in proper place
172            STC      1,LOC           Same for low order part
173     *
174     * Result is out of range, but is it in extended range?
175     *
176            LTR      5,5             Is exponent < 1?
177            BH       NOUN            No underflow
178            SDR      RHOA,RHOA       Force result to zero
179            SDR      RLOA,RLOA
180            MVC      MSG+5(1),=C'8'  Fill in underflow message
181            MVC      MSGFLOW(3),UNDER
182            LA       1,I208          Error code
183            B        XLPSW           Do error message processing
184     *
185     * No underflow - check for overflow
186     *
187     NOUN   C        5,I16383        Is exponent too big?
188            BL       NOV             No overflow
189            LD       RHOA,HBIG       Set to big number
190            LD       RLOA,LBIG       Set to big number
191            MVC      MSG+5(1),=C'7'  Fill in overflow message
192            MVC      MSGFLOW(3),OVER
193            LA       1,I207          Error code
194            LTR      2,2             Check for sign of result
195            BNZ      XLPSW           Not negative-write error message
196            LCDR     RHOA,RHOA       Make sign of big number negative
197            LCDR     RLOA,RLOA
198            B        XLPSW           Write overflow message
199     *
200     * Result is in expanded range
201     *
202     NOV    LD       RHOA,HOC        Transfer result to FPR
203            LD       RLOA,LOC        Same for low order part
204     *
205     DONE   LD       RHOB,HOX        Restore B register
206     RETURN LTDR     RHOA,RHOA       Set the condition code
207            L        13,SAVE+4
208            LM       14,12,12(13)    Restore caller's registers
209            MVI      12(13),X'FF'
210            BR       14              Return to caller
211     *
212     * Hex to EBCDIC translation routine
213     *
214     XLPSW  ST       1,ERRLIST+8     Save error code in parameter list
215            O        5,I16383        Turn off all but low order 14 bits
216            ST       5,HOXA             of exponent and save for user fixup
217            L        1,SAVE+4        Pick up caller's save area address
218            LA       1,12(1)         Point to caller's return address
219            LA       2,MSGPSW        Point to PSW output area
220            LA       3,4             Length of address field in bytes
221            BAL      14,XLATE        Translate the address
222            LA       1,HOC           Point to the result
223            LA       2,MSGREG        Point to result output area
224            LA       3,16            Length of result in bytes
```

```
225          LA     14,ERRMSG
226   XLATE  SR     4,4           Clean out the register
227          IC     4,0(1)        Pick up next byte to be translated
228          LA     1,1(1)        Increment for next time around
229          SRDL   4,4           Index to first hex digit
230          A      4,AHEXTAB     Translate table offset
231          MVC    0(1,2),0(4)   Move translated character to message
232          SRL    5,28          Index to second hex digit
233          A      5,AHEXTAB     Translate table offset
234          MVC    1(1,2),0(5)   Move it to message
235          LA     2,2(2)        Next output location
236          BCT    3,XLATE       Translate next byte unless all done
237          BR     14            Return
238   *
239   * Error message print routine
240   *
241   ERRMSG LR     2,15          Save base register
242          USING  START,2       Reestablish addressability
243          LA     1,ERRLIST     Point to parameter list
244          L      15,AERRMON    Call error monitor
245          BALR   14,15
246          LR     15,2          Reestablish old base address
247          DROP   2
248          USING  START,15
249          B      DONE
250   *
251          DS     0D
252   HOA    DS     1D
253   LOA    DS     1D
254   HOB    DS     1D
255   LOB    DS     1D
256   HOC    DS     1D
257   LOC    DS     1D
258   HOX    DS     1D
259   HOXA   DS     1D
260   HOXB   DS     1D
261   HBIG   DC     X'7FFFFFFFFFFFFFFF'
262   LBIG   DC     X'FEFFFFFFFFFFFFFF'
263   SMALL  DC     X'0010000000000000'
264   *
265   M28    DC     F'-28'
266   I28    DC     F'28'
267   NBIAS  DC     F'64'
268   I127   DC     F'127'
269   I128   DC     F'128'
270   I8192M64 DC   F'8128'       Remove standard bias, add expanded bias
271   I16383 DC     F'16383'
272   X80    DC     X'80000000000000000000000000000000' Sign swapper
273   *
274   SAVE   DS     18F
275   *
276   ERRLIST DC    A(MSGLNG)
277          DC     A(RETCODE)
278          DC     A(I207)
279          DC     A(HOC)
280          DC     X'80'
281          DC     AL3(HOXA)
```

| | | | |
|---|---|---|---|
| 282 | AHEXTAB | DC | A(HEXTAB) |
| 283 | HEXTAB | DC | C'0123456789ABCDEF' |
| 284 | I207 | DC | F'207' |
| 285 | I208 | DC | F'208' |
| 286 | RETCODE | DS | F |
| 287 | AERRMON | DC | V(IHOERRM) |
| 288 | MSGLNG | DC | A(ENDMSG-MSG) |
| 289 | MSG | DC | C'IHO208I IBCOM - PROGRAM INTERRUPT-' |
| 290 | MSGFLOW | DC | C'XXXERFLOW PSW ADDRESS IS ' |
| 291 | MSGPSW | DS | CL8 |
| 292 | | DC | C' REGISTER CONTAINED ' |
| 293 | MSGREG | DS | CL32 |
| 294 | ENDMSG | EQU | * |
| 295 | UNDER | DC | C'UND' |
| 296 | OVER | DC | C' OV' |
| 297 | | END | |

Referring now to Table 2 and FIG. 3, there is illustrated the multiplication of two floating point numbers utilizing the invention. In order to multiply two floating point numbers, each exponent is extracted by determining if it is in the normal range. If it is in the normal range, a 7-bit exponent is extracted. If it is not in the normal range, a 14-bit exponent is extracted. The next step in the multiplication procedure is to multiply the fractions of the two arguments to produce the fraction of the result. The exponent of the result is formed by adding the exponents of the two input arguments and the exponent of the fraction of the result. If the result is in the normal range, a result with a 7-bit exponent is produced. If the result is not in the normal range, a result with a 14-bit exponent is produced. The software embodiment of the multiplication operation is set out in detail in Table 2.

TABLE 2

EXTENDED FLOATING POINT MULTIPLY ROUTINE

Copyright IBM Corporation 1984

```
 4  * Special extended precision multiplication of FPRs 0 and 4
 5  *
 6  IHOXMR04 CSECT
 7  RHOA     EQU    0
 8  RLOA     EQU    2
 9  RHOB     EQU    4
10  RLOB     EQU    6
11           USING  *,15         Set base register
12  START    B      BEGIN        BRANCH AROUND IDENTIFIER
13           DC     AL1(8)
14           DC     CL8'IHOXMR04'
15  *
16  * Before touching GPR's, save them
17  *
18  BEGIN    STM    14,12,12(13) Save caller's registers
19           LR     2,13
20           LA     13,SAVE
21           ST     2,SAVE+4
22           LTDR   RHOA,RHOA    Check high order part of A
23           BZ     RETURN       A is zero so done
24  *
25           LTDR   RHOB,RHOB    Check high order part of B
26           BNZ    BNOTO
```

| | | | |
|---|---|---|---|
| 27 | LDR | RHOA,RHOB | B is zero so set A to B |
| 28 | LDR | RLOA,RLOB | |
| 29 | B | RETURN | Finished |
| 30 | * | | |
| 31 | * Neither A nor B is zero -- save A and B and continue | | |
| 32 | * | | |
| 33 | BNOTO STD | RHOA,HOA | Save high order part of A |
| 34 | STD | RLOA,LOA | Save low order part of A |
| 35 | STD | RHOB,HOB | Save high order part of B |
| 36 | STD | RHOB,HOX | Save high order B for later restore |
| 37 | STD | RLOB,LOB | Save low order part of B |
| 38 | * | | |
| 39 | * Test of expanded range for both A and B | | |
| 40 | * | | |
| 41 | L | 2,HOA | Load high order A |
| 42 | X | 2,LOA | Exclusive or to check signs match |
| 43 | L | 3,HOB | Load high order B |
| 44 | X | 3,LOB | Exclusive or to check signs match |
| 45 | LTR | 2,2 | Is A in range? |
| 46 | BM | BLDEXP | No -- standard multiply not possible |
| 47 | LTR | 3,3 | Is B in range? |
| 48 | BM | BLDEXP | No -- standard multiply not possible |
| 49 | * | | |
| 50 | * A and B are in range -- check for result in range | | |
| 51 | * | | |
| 52 | IC | 0,HOA | Pick up high order A |
| 53 | N | 0,I127 | Strip off sign |
| 54 | IC | 1,HOB | Pick up high order B |
| 55 | N | 1,I127 | Strip off sign |
| 56 | AR | 0,1 | Add exponents |
| 57 | * Compensate for double bias on compare | | |
| 58 | C | 0,I191 | Check for overflow |
| 59 | BH | BLDEXP | High -- no standard multiply |
| 60 | C | 0,I64 | Check for underflow |
| 61 | BNH | BLDEXP | Low or equal -- no standard multiply |
| 62 | MXR | RHOA,RHOB | Do standard multiply |
| 63 | B | RETURN | Return to caller |
| 64 | * | | |
| 65 | * Build exponent of A | | |
| 66 | * | | |
| 67 | BLDEXP IC | 0,HOA | Load exponent of A |
| 68 | N | 0,I127 | Strip sign off of A |
| 69 | S | 0,NBIAS | Subtract hex 40 from exponent |
| 70 | LTR | 2,2 | Result >= 0 normal range |
| 71 | BNM | AINR | Yes--In range bypass 14-digit build |
| 72 | L | 1,LOA | Load low order part of A |
| 73 | SLL | 1,1 | Strip off first bit |
| 74 | SLDL | 0,7 | Now have 14-bit exponent in GPR 0 |
| 75 | AINR ST | 0,HOXA | Save exponent of A for later use |
| 76 | * | | |
| 77 | * Build exponent of B | | |
| 78 | * | | |
| 79 | IC | 0,HOB | Load exponent of B |
| 80 | N | 0,I127 | Strip off sign of B |
| 81 | S | 0,NBIAS | Subtract hex 40 from exponent |
| 82 | LTR | 3,3 | Result > 0 if normal number |
| 83 | BNM | BINR | |

```
 84            L       1,LOB           Load low order part of B
 85            SLL     1,1             Strip off first bit
 86            SLDL    0,7             Now have 14-bit exponent in GPR 0
 87  *
 88  * Build sign of result
 89  *
 90  BINR      L       2,HOA           Get high order part of A
 91            L       3,HOB           Get high order part of B
 92            XR      2,3             If signs are alike, result positive
 93            SRL     2,31            Clear out all but the sign
 94            SLL     2,7
 95  *
 96  * Exponent of result C = X + 1 or 0
 97  *
 98            A       0,HOXA          X = HOX(A) + HOX(B) in GPR 0
 99            LA      1,64            Set exponent to 0100 0000
100            STC     1,HOA           Store exponent into A
101            STC     1,HOB           Store exponent into B
102  *
103  * At this point A and B are of order 1
104  *
105            LD      RHOA,HOA        Restore high order part of A
106            LD      RHOB,HOB        Restore high order part of B
107            MXR     RHOA,RHOB       Multiply A and B
108  *
109  * Extract exponent of result and add to X
110  *
111            STD     RHOA,HOC        Store high order part of C
112            STD     RLOA,LOC        Store low order part of C
113            IC      1,HOC           Put exponent into GPR 1
114            AR      0,1             Add result to X
115  *
116  * See if result is in range
117  *
118            LTR     0,0             Compare X to 0
119            BL      COR
120            C       0,I127          Compare X to 127
121            BH      COR
122  *
123  * Result is in range - add in bias and put in sign
124  *
125            LR      1,0             Save exponent with bias
126            OR      0,2             Put in sign
127            STC     0,HOC           Store exponent
128            LD      RHOA,HOC        Put result into register for return
129            LA      1,X'FF2'(1)     Subtract 14 from exponent
130            N       1,I127          Turn sign off
131            OR      1,2             Put in sign of result
132            STC     1,LOC           Put in correct LOX(C)
133            LD      RLOA,LOC        Transfer result to FPR
134            B       DONE
135  *
136  * Fix up exponent with proper sign whether ok, under or overflow
137  *
138  COR       A       0,I8192M64      Add in expanded bias
139            LR      5,0             Save exponent
140            SRDL    0,7             Separate exponent into 2 parts
```

```
141              SRL      1,25           Right justify LOX
142              N        0,I127         In case of overflow turn high bits off
143              OR       0,2            Put sign bit in place
144              X        2,I128         Switch sign
145              OR       1,2            Put sign on LOC
146              STC      0,HOC          Store exponent in proper place
147              STC      1,LOC          Same for low order part
148     *
149     * Result is out of range, but is it in extended range?
150     *
151              LTR      5,5            Is exponent < 1?
152              BH       NOUN           No underflow
153              SDR      RHOA,RHOA      Force result to zero
154              SDR      RLOA,RLOA
155              MVC      MSG+5(1),=C'8' Fill in underflow message
156              MVC      MSGFLOW(3),UNDER
157              LA       1,I208         Error code
158              B        XLPSW          Do error message processing
159     *
160     * No underflow - check for overflow
161     *
162     NOUN     C        5,I16383       Is exponent too big?
163              BL       NOV            No overflow
164              LD       RHOA,HBIG      Set to big number
165              LD       RLOA,LBIG      Set to big number
166              MVC      MSG+5(1),=C'7' Fill in overflow message
167              MVC      MSGFLOW(3),OVER
168              LA       1,I207         Error code
169              LTR      2,2            Check for sign of result
170              BNZ      XLPSW          Not negative-write error message
171              LCDR     RHOA,RHOA      Make sign of big number negative
172              LCDR     RLOA,RLOA
173              B        XLPSW          Do error message processing
174     *
175     * Result is in expanded range
176.    *
177     NOV      LD       RHOA,HOC       Transfer result to FPR
178              LD       RLOA,LOC       Same for low order part
179     *
180     *
181     DONE     LD       RHOB,HOX       Restore B register
182     RETURN   LTDR     RHOA,RHOA      Set the condition code
183              L        13,SAVE+4
184              LM       14,12,12(13)   Restore rest of caller's registers
185              MVI      12(13),X'FF'   Set traceback flag
186              BR       14             Return to caller
187     *
188     * Hex to EBCDIC translation routine
189     *
190     XLPSW    ST       1,ERRLIST+8    Save error code in parameter list
191              O        5,I16383       Turn off all but low order 14 bits
192              ST       5,HOXA            of exponent and save for user fixup
193              L        1,SAVE+4       Pick up caller's save area address
194              LA       1,12(1)        Point to caller's return address
195              LA       2,MSGPSW       Point to PSW output area
196              LA       3,4            Length of address field in bytes
197              BAL      14,XLATE       Translate the address
```

```
198              LA      1,HOC           Point to the result
199              LA      2,MSGREG        Point to result output area
200              LA      3,16            Length of result in bytes
201              LA      14,ERRMSG
202   XLATE     SR      4,4             Clean out the register
203             IC      4,0(1)          Pick up next byte to be translated
204             LA      1,1(1)          Increment for next time around
205             SRDL    4,4             Index to first hex digit
206             A       4,AHEXTAB       Translate table offset
207             MVC     0(1,2),0(4)     Move translated character to message
208             SRL     5,28            Index to second hex digit
209             A       5,AHEXTAB       Translate table offset
210             MVC     1(1,2),0(5)     Move it to message
211             LA      2,2(2)          Next output location
212             BCT     3,XLATE         Translate next byte unless all done
213             BR      14              Return
214   *
215   * Error message print routine
216   *
217   ERRMSG    LR      2,15            Save base register
218             USING   START,2         Reestablish addressability
219             LA      1,ERRLIST       Point to parameter list
220             L       15,AERRMON      Call error monitor
221             BALR    14,15
222             LR      15,2            Reestablish old base address
223             DROP    2
224             USING   START,15
225             B       DONE
226   *
227             DS      0D
228   HOA       DS      1D
229   LOA       DS      1D
230   HOB       DS      1D
231   LOB       DS      1D
232   HOC       DS      1D
233   LOC       DS      1D
234   HOX       DS      1D
235   HOXA      DS      1D
236   HBIG      DC      X'7FFFFFFFFFFFFFFF'
237   LBIG      DC      X'FEFFFFFFFFFFFFFF'
238   SMALL     DC      X'0010000000000000'
239   *
240   I64       DS      0F
241   NBIAS     DC      F'64'
242   I127      DC      F'127'
243   I128      DC      F'128'
244   I191      DC      F'191'
245   I8192M64  DC      F'8128'         Remove standard bias, add expanded bias
246   I16383    DC      F'16383'
247   *
248   SAVE      DS      18F
249   *
250   ERRLIST   DC      A(MSGLNG)
251             DC      A(RETCODE)
252             DC      A(I207)
253             DC      A(HOC)
254             DC      X'80'
255             DC      AL3(HOXA)
256   AHEXTAB   DC      A(HEXTAB)
```

```
257  HEXTAB    DC      C'0123456789ABCDEF'
258  I207      DC      F'207'
259  I208      DC      F'208'
260  RETCODE   DS      F
261  AERRMON   DC      V(IHOERRM)
262  MSGLNG    DC      A(ENDMSG-MSG)
263  MSG       DC      C'IHO208I IBCOM - PROGRAM INTERRUPT-'
264  MSGFLOW   DC      C'XXXERFLOW PSW ADDRESS IS '
265  MSGPSW    DS      CL8
266            DC      C' REGISTER CONTAINED '
267  MSGREG    DS      CL32
268  ENDMSG    EQU     *
269  UNDER     DC      C'UND'
270  OVER      DC      C' OV'
271            END
```

TABLE 3

SAMPLE PROGRAM INVOKING THE FLOATING POINT
ADD OR MULTIPLY ROUTINES

Copyright IBM Corporation 1984

```
      C
          100 CONTINUE
              WRITE(6,110)
          110 FORMAT(' TEST OF ADD FUNCTION')
              WRITE(6,120)
          120 FORMAT(' ENTER A AND B')
              READ(5,*,ERR=10,END=10)A,B
              C = A + B
              WRITE(6,130) A, B, C
          130 FORMAT(' A    =',1PQ44.36,/' B    =',1PQ44.36,/' A+B  =',1PQ44.36)
              GO TO 100
      C
          200 CONTINUE
              WRITE(6,210)
          210 FORMAT(' TEST OF SUBTRACT FUNCTION')
              WRITE(6,220)
          220 FORMAT(' ENTER A AND B')
              READ(5,*,ERR=10,END=10)A,B
              C = A - B
              WRITE(6,230) A, B, C
          230 FORMAT(' A    =',1PQ44.36,/' B    =',1PQ44.36,/' A-B  =',1PQ44.36)
              GO TO 200
      C
          300 CONTINUE
              WRITE(6,310)
          310 FORMAT(' TEST OF MULTIPLY FUNCTION')
              WRITE(6,320)
          320 FORMAT(' ENTER A AND B')
              READ(5,*,ERR=10,END=10)A,B
              C = A * B
              WRITE(6,330) A, B, C
          330 FORMAT(' A    =',1PQ44.36,/' B    =',1PQ44.36,/' A*B  =',1PQ44.36)
```

```
37        GO TO 300
38  C
39     400 CONTINUE
40        WRITE(6,410)
41     410 FORMAT(' TEST OF DIVIDE FUNCTION')
42        WRITE(6,420)
43     420 FORMAT(' ENTER A AND B')
44        READ(5,*,ERR=10,END=10)A,B
45        C = A / B
46        WRITE(6,430) A, B, C
47     430 FORMAT(' A   =',1PQ44.36,/' B   =',1PQ44.36,/' A/B =',1PQ44.36)
48        GO TO 400
```

TABLE 4

SAMPLE OUTPUT OF THE CODE SHOWN
IN TABLES 1, 2, AND 3

Copyright IBM Corporation 1984

```
PICK AN OPTION (NULL TO QUIT)
  1. ADD          2. SUBTRACT      3. MULTIPLY       4. DIVIDE
  5. EXP          6. LOG10         7. POWER          8. IPOWER
  9. ARSCN       10. ATAN         11. ATAN2         12. SIN-COS
 13. TAN-COT     14. SQRT         15. ERF-ERFC      16. TANH
 17. SINH-COSH   18. COMPLEX */   19. CQABS         20. CQSQRT
 21. COMPLEX LOG 22. COMPLEX EXP  23. CCOS AND CSIN 24. COMPLEX IPOWER
?
1
TEST OF ADD FUNCTION
ENTER A AND B
?
1.1q5000 2.2q5001
A   =  1.100000000000000000000000000000000003 +5000
B   =  2.200000000000000000000000000000000000 +5001
A+B =  2.310000000000000000000000000000000000 +5001
TEST OF ADD FUNCTION
ENTER A AND B
?

PICK AN OPTION (NULL TO QUIT)
  1. ADD          2. SUBTRACT      3. MULTIPLY       4. DIVIDE
  5. EXP          6. LOG10         7. POWER          8. IPOWER
  9. ARSCN       10. ATAN         11. ATAN2         12. SIN-COS
 13. TAN-COT     14. SQRT         15. ERF-ERFC      16. TANH
 17. SINH-COSH   18. COMPLEX */   19. CQABS         20. CQSQRT
 21. COMPLEX LOG 22. COMPLEX EXP  23. CCOS AND CSIN 24. COMPLEX IPOWER
?
3
TEST OF MULTIPLY FUNCTION
ENTER A AND B
?
1.1q300 2.2q301
A   =  1.100000000000000000000000000000000000 +300
B   =  2.200000000000000000000000000000000015 +301
A*B =  2.420000000000000000000000000000000015 +601
TEST OF MULTIPLY FUNCTION
ENTER A AND B
?
```

```
43    PICK AN OPTION (NULL TO QUIT)
44    1. ADD              2. SUBTRACT       3. MULTIPLY        4. DIVIDE
45    5. EXP              6. LOG10          7. POWER           8. IPOWER
46    9. ARSCN           10. ATAN          11. ATAN2          12. SIN-COS
47   13. TAN-COT         14. SQRT          15. ERF-ERFC       16. TANH
48   17. SINH-COSH       18. COMPLEX */    19. CQABS          20. CQSQRT
49   21. COMPLEX LOG     22. COMPLEX EXP   23. CCOS AND CSIN  24. COMPLEX IPOWER
50    ?
```

Referring now to Table 3, there is shown an interactive program fragment invoking the add and multiply floating point functions embodying the invention. The invocation is respectively defined by statements 100–130 for floating point add and 300–330 for floating point multiply. Relatedly, Table 4 shows a displayed output of the code execution of Table 3 in combination with the execution shown in Tables 1 and 2. Note that the output is that of a menu from which an operator may select one or more functions. For purposes of illustration, either the add or multiply functions may be selected, operands A and B entered, and the resultant depicted as either A+B or A×B.

Alterations and modifications can be made by those having skill in this art without departing from the spirit and scope of the invention. One technique might be to modify high-level language compilers such as a FORTRAN compiler. Such a compiler will either encode the extended floating point arithmetic operations or invoke calls to subroutines to execute these functions. Alternatively, the compiler could generate several so-called "no operations" (NOP) around the extended precision operations in order to allow a post-processor to scan the object code and make the needed changes.

We claim:

1. A new use of the atomic operation of reformatting at least a portion of a pair of words used to represent either a numerical operand or resultant in a floating point arithmetic processor of the IBM System/370 type, the first word of a pair corresponding to a high-order sign, exponent, and fraction, while the second word corresponds to the low-order sign, exponent, and fraction, comprising the steps of:

(a) ascertaining the floating point range of a numerical operand and of any resultant obtained by the arithmetic operation upon said operand or multiple operands, said step includes comparing the signs of the high- and low-order words of a pair such that a first match condition indicates that the operand or resultant lies within a normal range while a second match condition indicates that the operand or resultant lies within the extended range; and (b) reformatting the low-order word to contain an operand or resultant when said operand or resultant lies in an extended range.

2. A method for operatively extending the exponent range in a floating point arithmetic processor of the type in which each numerical signal value is expressed as a pair of formatted words; the first word corresponding to a high-order sign, exponent, and fraction while the second word corresponding to a low-order sign, exponent, and fraction; the processor responsive to the formatted word pair ordinarily not operating upon selective low-order words or fields, comprising the steps of:

(a) ascertaining the floating point range of the operand of each numerical signal value and of any resultant obtained by the arithmetic operation upon said operand or multiple operands by testing the match condition of the signs in the high- and low-order words of each pair such that a match indicates that a corresponding operand or resultant lies outside the normal range while a mismatch indicates the corresponding operand or resultant lies in the extended range; and (b) reformatting any operands or resultants which lie in the extended range in a sign bit-manipulated and protected field of the corresponding low-order word by utilizing the exponent field of the low-order word as an extension of the exponent field of the high-order word.

3. A method according to claim 2, wherein the exponent field of the low-order word is transparent to the floating point processor where the signs of the high- and low-order words of a pair match.

* * * * *